(12) United States Patent
Hwang

(10) Patent No.: US 8,229,860 B2
(45) Date of Patent: Jul. 24, 2012

(54) PAYMENT SYSTEM AND ITS METHOD FOR SUPPORTING USER VERIFICATION IN VOIP CONFIGURATION

(75) Inventor: Chang-Yeop Hwang, Seoul (KR)

(73) Assignee: Mobilians Co., Ltd., Seoul (KR)

( * ) Notice: Subject to any disclaimer, the term of this patent is extended or adjusted under 35 U.S.C. 154(b) by 1571 days.

(21) Appl. No.: 11/659,515

(22) PCT Filed: Aug. 5, 2005

(86) PCT No.: PCT/KR2005/002565
§ 371 (c)(1),
(2), (4) Date: Feb. 5, 2007

(87) PCT Pub. No.: WO2006/014093
PCT Pub. Date: Feb. 9, 2006

(65) Prior Publication Data
US 2007/0291741 A1 Dec. 20, 2007

(30) Foreign Application Priority Data

Aug. 5, 2004 (KR) .................. 10-2004-0061607

(51) Int. Cl.
*G06Q 20/00* (2006.01)
(52) U.S. Cl. ................. 705/75; 705/76; 726/1
(58) Field of Classification Search ............. 705/39–45, 705/64–79
See application file for complete search history.

(56) References Cited

U.S. PATENT DOCUMENTS

| 6,108,790 | A | 8/2000 | Moriya et al. |
| 2002/0069287 | A1 | 6/2002 | Sakata |
| 2003/0014361 | A1* | 1/2003 | Klatt et al. ................. 705/40 |
| 2003/0123434 | A1 | 7/2003 | Hirayama et al. |
| 2003/0187800 | A1* | 10/2003 | Moore et al. ................. 705/52 |
| 2003/0208444 | A1* | 11/2003 | Sauer ................. 705/40 |
| 2004/0109461 | A1 | 6/2004 | Suzuki et al. |
| 2004/0122685 | A1* | 6/2004 | Bunce ................. 705/1 |
| 2005/0180408 | A1 | 8/2005 | Mangetsu |

* cited by examiner

*Primary Examiner* — Calvin L Hewitt, II
*Assistant Examiner* — Tsan-Yu J Huang
(74) *Attorney, Agent, or Firm* — Edwards Wildman Palmer LLP

(57) ABSTRACT

Disclosed is a payment system and method for supporting user verification in VoIP configuration by receiving secret number or VoIP phone number of a user as payment information on Internet and completing the payment by user verification and occupancy verification. The payment system includes a user terminal for inputting secret number or VoIP phone number as payment information, a payment gateway server for receiving the payment information from the user terminal to intermediate user verification and approving payment by occupancy verification, and a central communication company server for receiving the payment information from the payment gateway server to verify the user and receiving a final payment approval to add a payment amount to communication charges of the user terminal and bill the charges. The payment system prevents illegal payment by fraudulent use of the user information.

19 Claims, 8 Drawing Sheets

[Fig. 1]
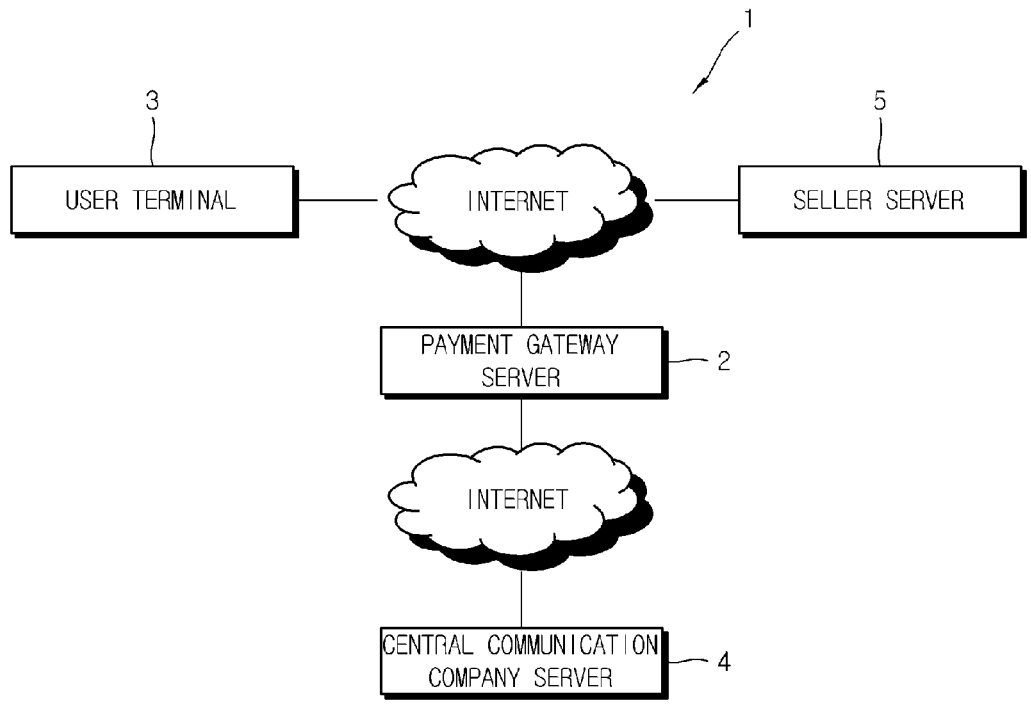
[Fig. 2]
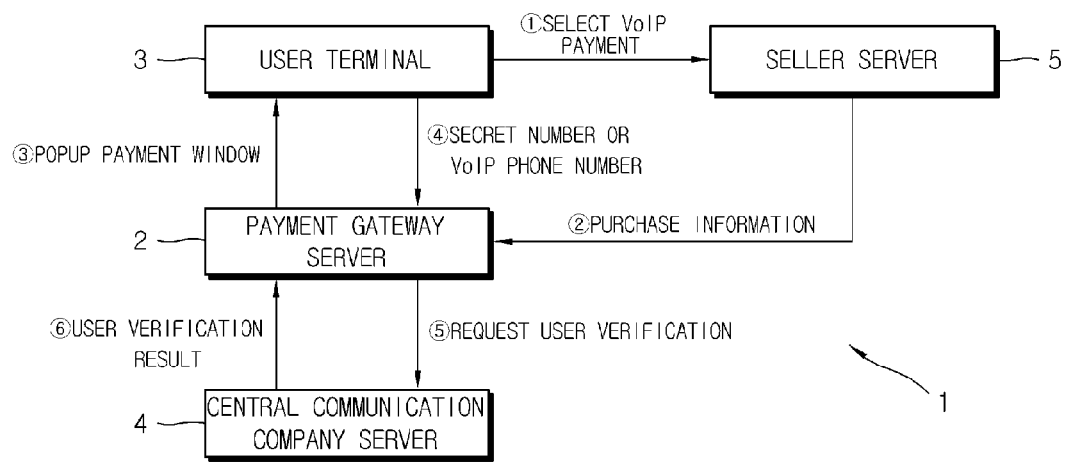

[Fig. 3]
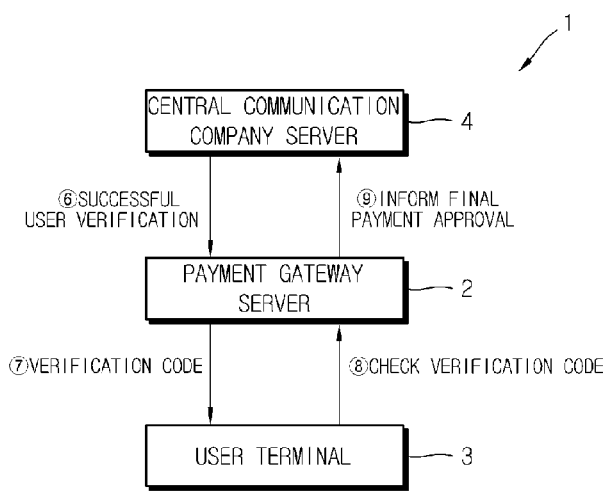
[Fig. 4]
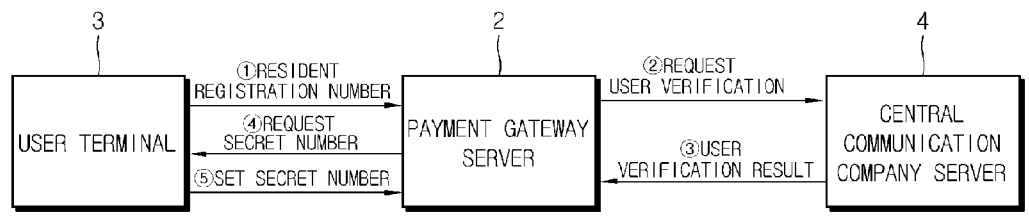

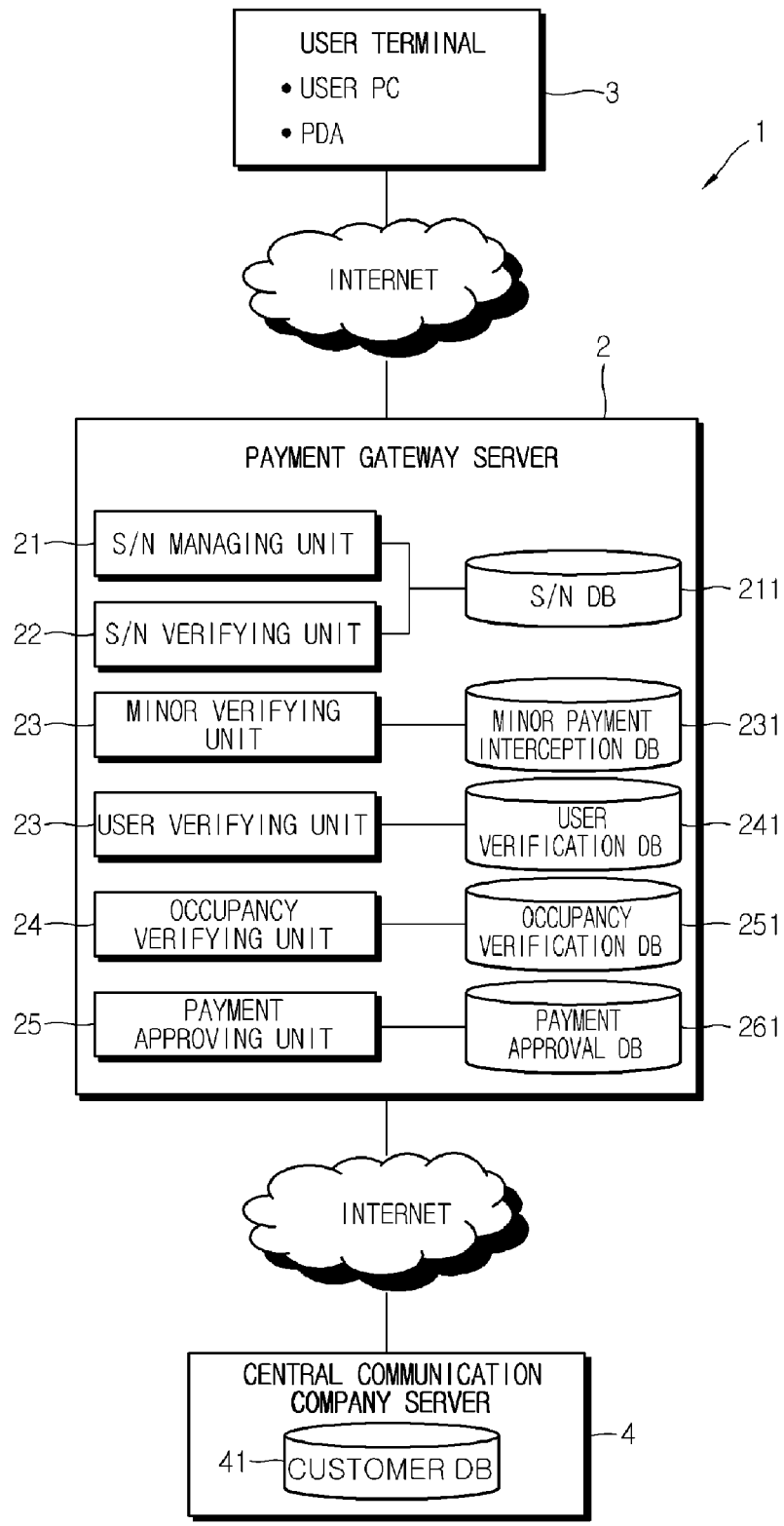
[Fig. 5]

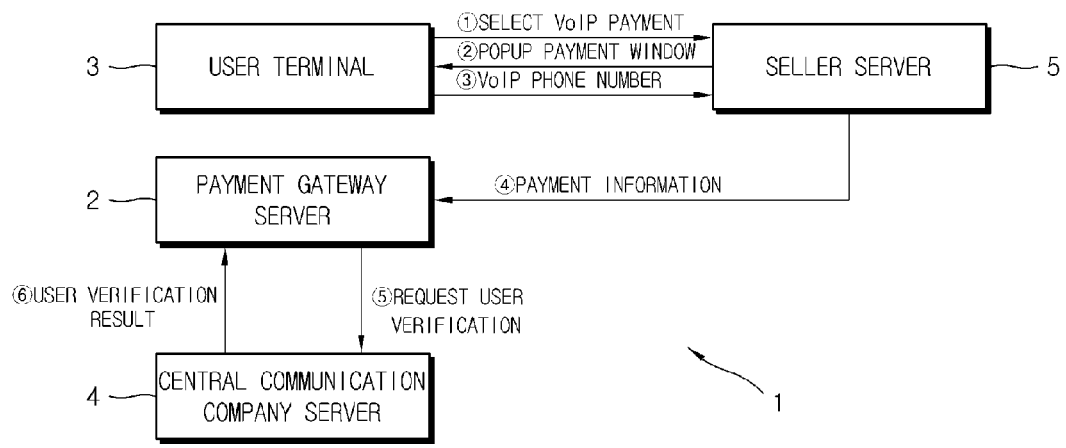
[Fig. 6]
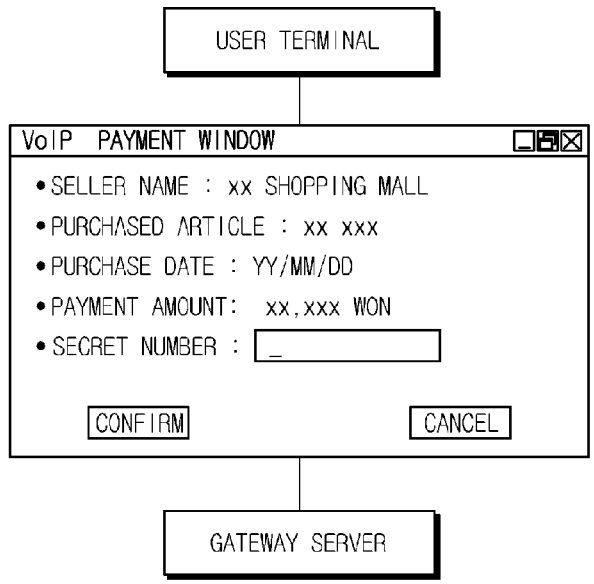
[Fig. 7]

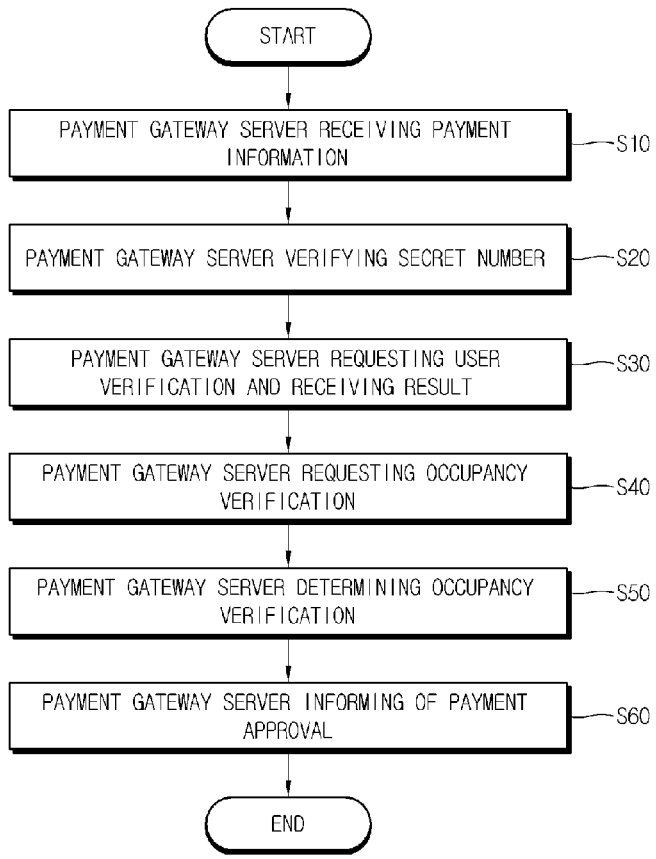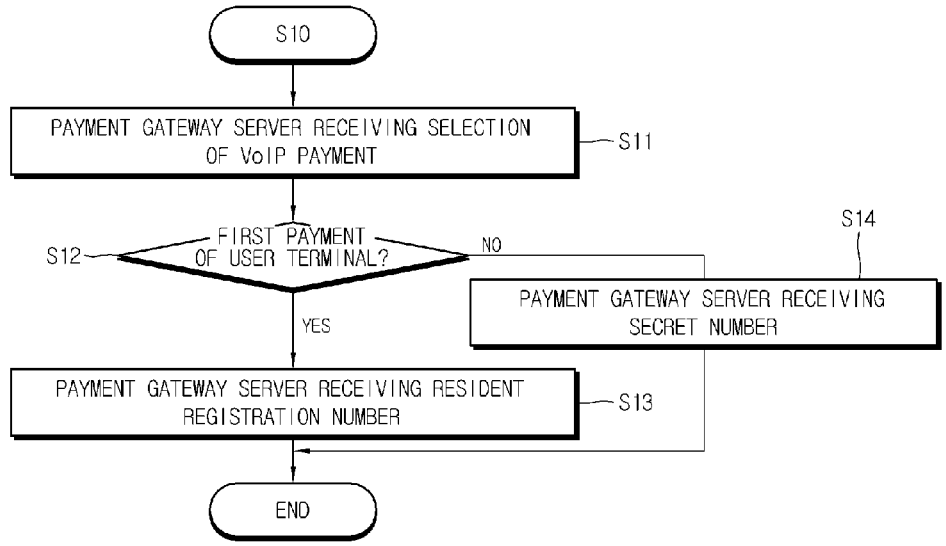

[Fig. 10]
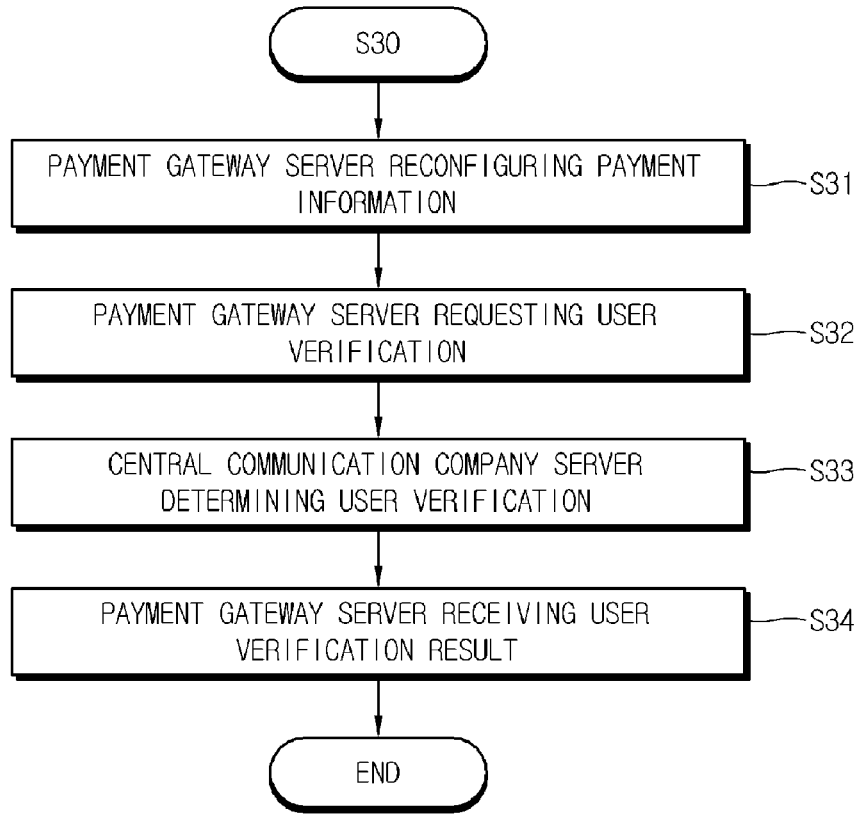
[Fig. 11]
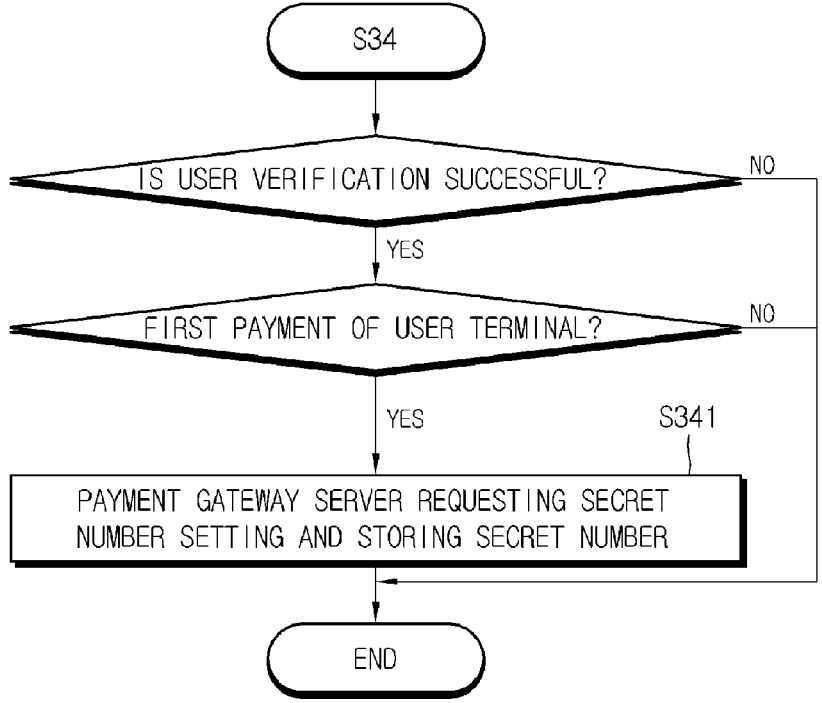

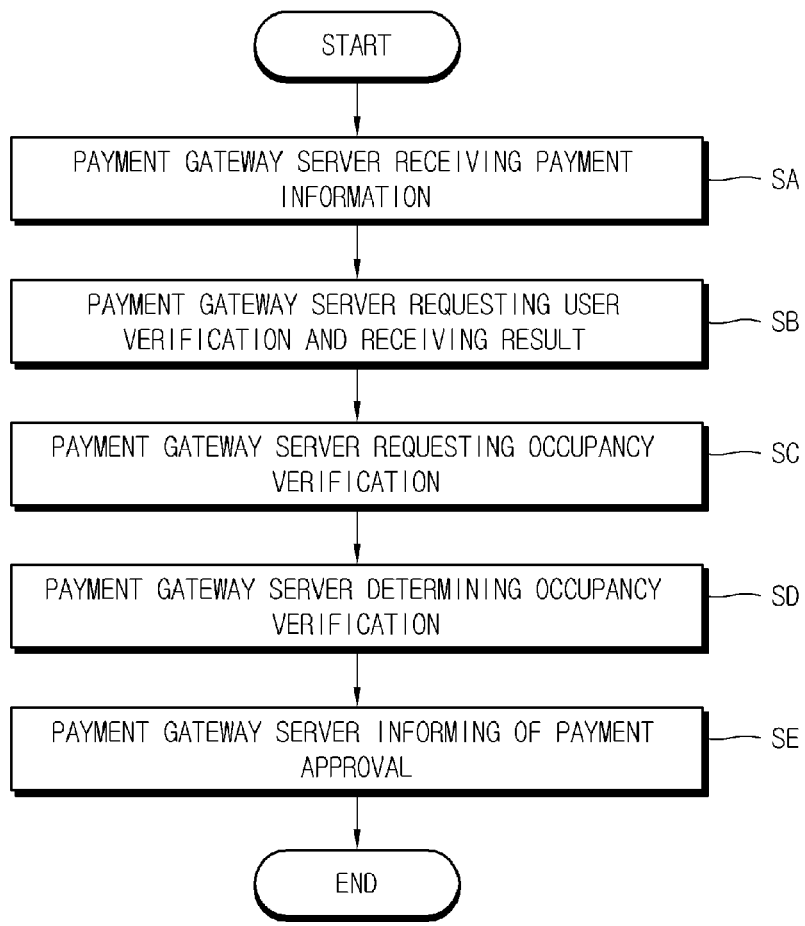
[Fig. 12]
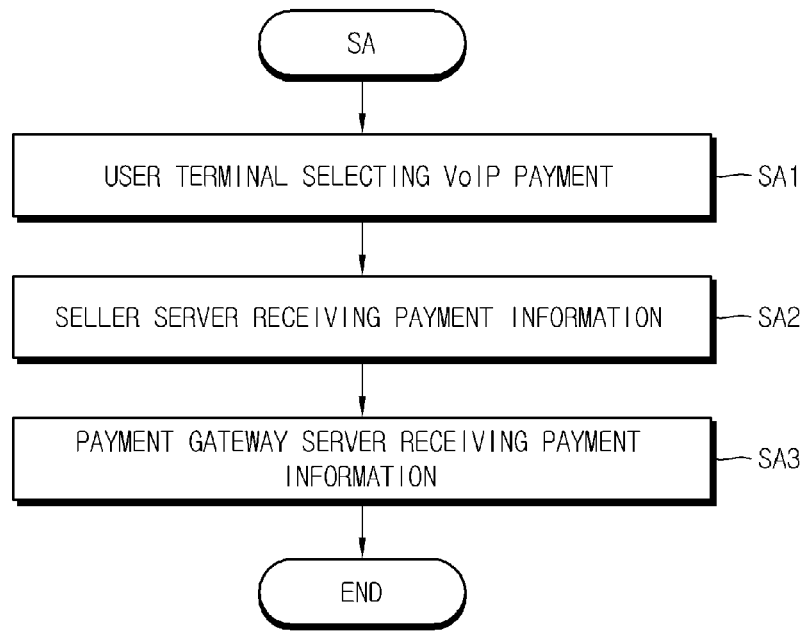
[Fig. 13]

[Fig. 14]
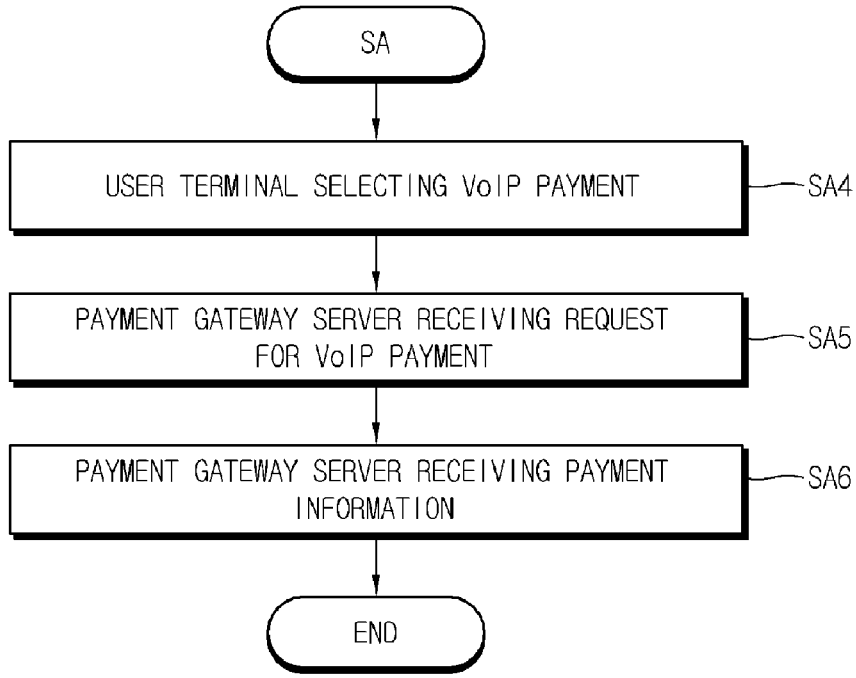
[Fig. 15]
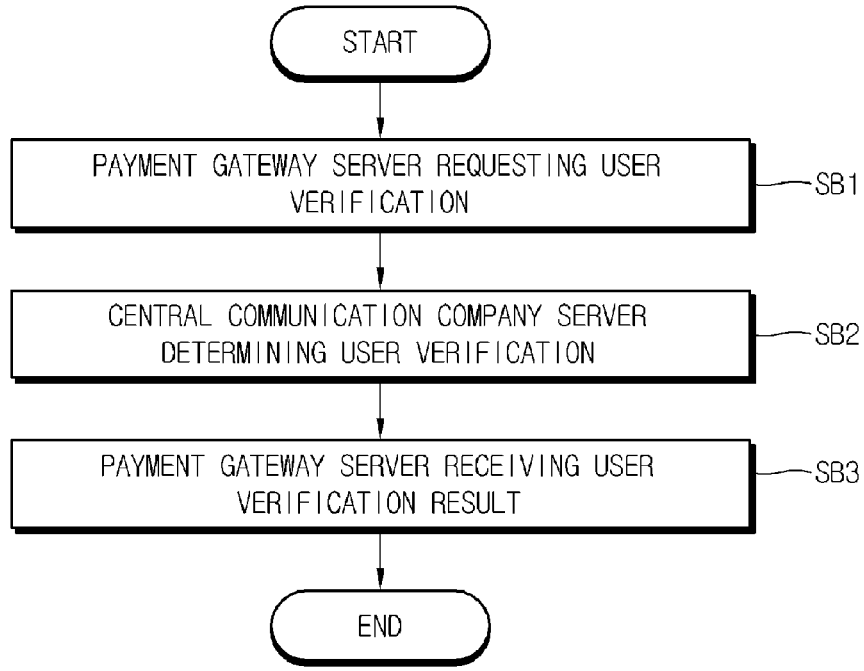

PAYMENT SYSTEM AND ITS METHOD FOR SUPPORTING USER VERIFICATION IN VOIP CONFIGURATION

CROSS-REFERENCE TO RELATED APPLICATION(S)

This application is a U.S. national phase application, pursuant to 35 U.S.C. §371, of PCT international application Ser. No. PCT/KR2005/002565, filed Aug. 5, 2005, which claims priority to Korean application 10-2004-0061607, filed Aug. 5, 2004. The entire contents of the aforementioned patent applications are incorporated herein by reference.

TECHNICAL FIELD

The present invention relates to a payment system and method for supporting user verification in VoIP configuration, and more particularly to a payment system and method for receiving a VoIP phone number of a user as payment information on Internet and completing the payment by user verification and occupancy verification.

BACKGROUND ART

VoIP (Voice over Internet Protocol) is a term indicating phone technique under Internet environments for equipments transmitting voice information using IP. Generally, it is not a traditional protocol based on lines like PSTN (Public Switched Telephone Network), but it sends voice information in a digital pattern over discontinuous packets. VoIP and Internet phone techniques are advantageous in that phone service is integrally realized using the existing IP network as it is so that a user may get toll or international telephone service under Internet or intranet environments only with a local telephone charge.

Meanwhile, an Internet phone (VoIP), which was dedicated only to sending a call, is endowed with a called number since the second half of 2004, so its market is forecasted to be more increased. Local telephone service providers such as KT and Hanaro were negative to Internet phones, but they recently announced policies to actively join in the Internet phones according to the change of market. Thus, it is postponed that many phone subscribers of PSTN who use Internet will use Internet phones.

The present invention provides a new payment method using user verification in VoIP configuration, which may supplement, improve and replace a conventional telephone payment method, and the new payment method of the present invention is used for payment of on-line contents or charges using a VoIP terminal under the condition that a conventional PSTN is shifted into an IP telephone network.

The conventional payment method using a phone number has advantages that there is no need for inputting a complex card number or an account number since a user inputs for payment a phone number, which is generally always memorized by the user, in comparison to public payment methods using a card or wire-transfer.

In the conventional payment method using PSTN, a user selects a phone number payment as a payment method for goods or service on Internet, and then requests payment to a payment server. The payment server sends a verification number to the user through Internet, and the user makes a call to a payment agent by means of ARS, phone bills or 1588 service (that is a kind of a phone service endowing a representative phone number throughout the nation), or receives a call from the payment agent, and then inputs the verification number displayed on a web browser so that a fee charged to him/her is added to telephone charges.

Such a conventional phone payment method may not give clear verification to a user since a telephone may be used by several persons, so many claims and criticisms are made to the subject of contents payment. For example, since there is no restriction for a person under age to pay for fees of games or adult sites until the fees are added to telephone charges, this payment method has been attached as a main factor of unfair payments of infants. In addition, this payment method cannot present exact grounds about telephone call details of users against claims of users who insist on not making a payment on Internet, which may cause discomfort to consumers, payment agencies, and telephone service providers.

Accordingly, the government even formulated a plane that an authorized validation should be obligatorily used, but this is estimated to cause inactivity of phone payment markets and inconvenience in making payment on Internet.

In addition, the conventional telephone payment method needs somewhat inconvenient payment procedures for a user to make or receive a call and then input a verification number transmitted on Internet according to ARS guidance, so it is difficult to use and requires additional time for payment.

DISCLOSURE OF INVENTION

Technical Problem

The present invention is designed to solve the above problems of the prior art, and therefore it is an object of the invention to provide a payment system and method in which a VoIP communication service subscriber sets secret numbers for persons except him/her and for persons under age, and, if a user inputs a secret number as payment information, the system checks the user by means of verification of the secret number.

In addition, another object of the invention is to provide a payment system and method that receives a VoIP phone number as payment information from a user and then approves the payment using the VoIP phone number.

Still another object of the invention is to provide a payment system and method, which is capable of conducting user verification by determining whether a secret number or a VoIP phone number input by a user is coincided with customer information of an existing VoIP communication service subscriber, and clearly checking an intension of a user for the payment by means of occupancy verification.

Technical Solution

In order to accomplish the above object, the present invention provides a VoIP (Voice over Internet Protocol) payment system for supporting user verification and payment in VoIP configuration by using a secret number input by a user, the system including: a user terminal allocated with peculiar IP (Internet Protocol) address and VoIP phone number to receive VoIP communication service, receiving a secret number from a user as payment information through a popup payment window, and transmitting the IP address and the received secret number to a payment gateway server to receive a payment approval result for the payment information; a payment gateway server receiving and storing a resident registration number and a secret number from the user terminal through a wire/wireless network, receiving the payment information from the user terminal, extracting the IP address and the secret number from the payment information to verify the secret number, transmitting the payment information including the IP address and the registration number to a central communication company server to receive a user verification result, informing the user terminal whether the payment is approved according to the user verification result, and determining a final payment approval and informing the central communication company server; and a central communication company server providing VoIP communication service to the user terminal, storing user information of the user terminal in a customer DB (database), receiving the payment information from the payment gateway server through a wire/wireless network to compare the payment information with the user information stored in the customer DB and transmit a user verification result to the payment gateway server, and informed of a final payment approval from the payment gateway server to add a payment amount to communication charges of the user terminal and bill the charges.

Preferably, the payment gateway server includes a secret number managing unit receiving IP address, resident registration number and secret number of a VoIP communication service subscriber from the user terminal, receiving additional secret numbers for other users and minors, and storing the transmitted IP address, the resident registration number and a plurality of the secret numbers; a secret number DB for storing secret number user information including the IP address, the resident registration number and a plurality of the secret numbers corresponding to the IP address, transmitted to the secret number managing unit; a secret number verifying unit receiving the payment information from the user terminal, extracting the IP address and the secret number from the payment information, and searching the secret number DB to compare whether the IP address and the secret number are coincided; a user verifying unit extracting the resident registration number from the secret number DB, transmitting the payment information including the IP address and the resident registration number to the central communication company server, and receiving a user verification result from the central communication company server, in case the verification result of the secret number verifying unit is successful; a user verification DB in which the user verifying unit stores the payment information and the user verification result; an occupancy verifying unit generating a peculiar verification code, transmitting the verification code to the user terminal, and receiving a verification code again from the user terminal to compare the received verification code with the transmitted verification code, in case the user verification result is successful; an occupancy verification DB for storing the verification code generated by the occupancy verifying unit and the occupancy verification result; a payment approving unit informing the user terminal whether or not to approve the payment according to the user verification result of the user verifying unit or the occupancy verification result of the occupancy verifying unit, and informing the central communication company server of a final payment approval in case the payment approval is successful; and a payment approval DB for storing the final payment approval result processed by the payment approving unit and payment amount information.

In another aspect of the invention, there is also provided a VoIP payment system for supporting user verification and payment in VoIP configuration by using a VoIP phone number input by a user, the system including: a user terminal allocated with peculiar IP address and VoIP phone number to receive VoIP communication service, receiving a VoIP phone number from a user as payment information through a popup payment window, and transmitting the IP address and the received VoIP phone number to receive a payment approval result for the payment information; a payment gateway server receiving the payment information through a wire/wireless network, transmit ting the payment information to a central communication company server to receive a user verification result, informing the user terminal whether the payment is approved according to the user verification result, and determining a final payment approval and informing the central communication company server; and a central communication company server providing VoIP communication service to the user terminal, storing user information of the user terminal in a customer DB, receiving the payment information from the payment gateway server through a wire/wireless network to compare the payment information with the user information stored in the customer DB and transmit a user verification result to the payment gateway server, and informed of a final payment approval from the payment gateway server to add a payment amount to communication charges of the user terminal and bill the charges.

Preferably, the payment gateway server includes: a user verifying unit receiving the payment information and transmitting the payment information to the central communication company server, and receiving a user verification result from the central communication company server; a user verification DB in which the user verifying unit stores the payment information and the user verification result; an occupancy verifying unit generating a peculiar verification code, transmitting the verification code to the user terminal, and receiving a verification code again from the user terminal to compare the received verification code with the transmitted verification code, in case the user verification result is successful; an occupancy verification DB for storing the verification code generated by the occupancy verifying unit and the occupancy verification result; a payment approving unit informing the user terminal whether or not to approve the payment according to the user verification result of the user verifying unit or the occupancy verification result of the occupancy verifying unit, and informing the central communication company server of a final payment approval in case the payment approval is successful; a payment approval DB for storing the final payment approval result processed by the payment approving unit; and a payment settlement unit receiving a payment amount from the central communication company server, and settling the payment amount as a payment amount of a seller except a predetermined commission.

In still another aspect of the invention, there is also provided a VoIP payment method for supporting user verification and payment in VoIP configuration by using a secret number input by a user, the method including: (1) a payment gateway server providing a popup payment window to a user terminal that selects VoIP payment, and receiving payment information including a secret number input through the popup payment window and an IP address of the user terminal from the user terminal; (2) the payment gateway server extracting the IP address and the secret number from the received payment information, and comparing the extracted IP address and the secret number with data stored in a secret number DB to verify the secret number; (3) in case the secret number verification is successful, the payment gate way server transmitting payment information including the IP address and a resident registration number of a subscriber of the IP address to a central communication company server to request user verification, and receiving a user verification result from the central communication company server; (4) in case the user verification is successful, the payment gateway server generating a peculiar verification code and requesting occupancy verification to the user terminal as a selective additional step of the step (3); (5) the payment gateway server receiving the verification code from the user terminal, and comparing the received verification code with the verification code generated in the step (4) to determine an occupancy verification result; and (6) in case the user verification result of the step (3)

is successful or the occupancy verification result of the step (5) is successful, the payment gateway server informing the user terminal of payment approval and informing the central communication company server of a final payment approval.

In further another aspect of the invention, there is also provided a VoIP payment method for supporting user verification and payment in VoIP configuration by using a VoIP phone number input by a user, the method including: (a) a payment gateway server receiving payment information including a VoIP phone number input by a user and an IP address of the user terminal from the user terminal in a hub type or in a web type; (b) the payment gateway server transmitting the payment information to a central communication company server to request user verification, and receiving a user verification result from the central communication company server; (c) in case the user verification is successful, the payment gateway server generating a peculiar verification code and requesting occupancy verification to the user terminal as a selective additional step of the step (b); (d) the payment gateway server receiving the verification code from the user terminal, and comparing the received verification code with the verification code generated in the step (c) to determine an occupancy verification result; (e) in case the user verification result of the step (b) is successful or the occupancy verification result of the step (d) is successful, the payment gateway server informing the user terminal of payment approval and informing the central communication company server of a final payment approval; and (f) the payment gateway server receiving a payment amount from the central communication company server, and settling the payment amount except a predetermined commission as a payment amount of a seller.

Advantageous Effects

The payment system and method for supporting user verification in VoIP configuration according to the present invention may ensure stable and reliable payment by preventing payment of an illegal user, since, when a user inputs a secret number of a VoIP phone number as payment information, a payment gateway server requests user verification to a central communication company server, and then occupancy verification is executed through generation of a verification code only when the user verification is successful.

BRIEF DESCRIPTION OF THE DRAWINGS

These and other features, aspects, and advantages of preferred embodiments of the present invention will be more fully described in the following detailed description, taken accompanying drawings. In the drawings:

FIG. 1 shows a VoIP payment system according to an embodiment of the present invention;

FIGS. 2 and 3 are functional diagrams showing ser verification and occupancy verification of the VoIP payment system according to an embodiment of the present invention;

FIG. 4 is a functional diagram showing a secret number setting process of a payment gateway server according to a first embodiment of the present invention;

FIG. 5 is a block diagram showing a payment gateway server according to an embodiment of the present invention;

FIG. 6 is a functional diagram for user verification of a VoIP payment system according to a second embodiment of the present invention;

FIG. 7 shows a screen of a popup payment window according to an embodiment of the present invention;

FIG. 8 is a flowchart illustrating a VoIP payment method using a secret number according to a first embodiment of the present invention;

FIG. 9 is a flowchart illustrating the process of receiving payment information including a secret number of the payment gateway server according to the first embodiment of the present invention;

FIG. 10 is a flowchart illustrating a user verification process of the payment gateway server according to the first embodiment of the present invention;

FIG. 11 is a flowchart illustrating a secret number setting process of the payment gateway server according to the first embodiment of the present invention;

FIG. 12 is a flowchart showing a VoIP payment method using a VoIP phone number according to the second embodiment of the present invention;

FIGS. 13 and 14 are flowcharts illustrating hub-type and web-type payment information receiving processes of the payment gateway server according to the second embodiment of the present invention; and FIG. 15 is a flowchart for user verification of the payment gateway server according to the second embodiment of the present invention.

BEST MODE FOR CARRYING OUT THE INVENTION

The VoIP payment system and method according to the present invention is classified into a first embodiment using a secret number of a user for payment, and a second embodiment using a VoIP phone number of a user for payment. In addition, the first and second embodiments may execute user verification only or user verification and occupancy verification together according to a payment verification policy of a payment gateway server 2.

FIG. 1 shows a VoIP payment system 1 according to an embodiment of the present invention. The payment system 1 in VoIP configuration according to the present invention includes a user terminal 3, a payment gateway server 2 and a central communication company server 4, which are interconnected through wire/wireless network.

The user terminal 3 receives VoIP communication service from the central communication company server 4 and is allocated with a peculiar IP address and a VoIP phone number. In addition, a program module for VoIP communication is loaded in the user terminal 3. A user inputs a secret number or a VoIP phone number as payment information for payment at an Internet on-line shopping mall site or payment of a small amount of money, and the central communication company server 4 adds the money to telephone charges and bills it so that the user pays for the charges.

The payment gateway server 2 receives the payment information including a secret number or a VoIP phone number input by a user after selection of the VoIP payment, by means of web or hub. In the web type, the payment gateway server 2 provides a popup payment window to the user terminal 3, and the payment gateway server 2 directly receives the payment information including a secret number or a VoIP phone number input in the popup payment window by the user.

In particular, in the web type, data structure of the payment information may be checked through source code analysis of the popup payment window while the payment information is directly received from the user terminal 3, so the payment information may be drained out. However, in the hub type, the payment gateway server 2 may receive the payment information from a seller terminal 5 through separate communication having dedicated data structure, so it is more preferred due to excellent security.

In addition, the payment gateway server 2 transmits a request for payment from the user terminal 3 to the central communication company server 4 to intermediate user verification, informs the user terminal 3 of completion of payment if the user verification is successfully made by the central communication company server 4, and then reports final approval of payment to the central communication company server 4.

Preferably, the payment gateway server 2 may make occupancy verification after receiving a result of user verification, and then reports approval of payment to the user terminal 3 and the central communication company server 4 if the occupancy verification is successful. In particular, in case the occupancy verification is additionally made, it is advantageous that an intension of a user for the payment may be more clearly checked.

The central communication company server 4 allows a VoIP communication service applicant to subscribe as a member, provides a peculiar IP address and a VoIP phone number to a subscriber terminal, and stores them together with customer information (e.g., a resident registration number, an address and a name) and network environment information (e.g., NIC (Network Interface Card) number) to a customer DB 41. A communication company server service provider may be a large communication company such as KT, Thrunet, and Hanaro or other Internet service providers.

The central communication company server 4 receives a request for user verification together with the payment information from the payment gateway server 2. The payment information received by the central communication company server 4 includes an IP address of the user terminal 3 together with purchase information such as a seller, a product, and an article price in common. In addition, the payment information includes a resident registration number of a subscriber registered by the user in the payment gateway server 2, or a VoIP phone number input in the popup payment window by the user. The central communication company server 4 verifies the user using the IP address and the resident registration number extracted from the payment information, or the IP address and the VoIP phone number. At this time, the central communication company server 4 verifies the user by comparing the data in the payment information with customer information (e.g., IP address, resident registration number and VoIP phone number) previously stored by the subscriber when the VoIP communication service was requested. In particular, in case a NIC number automatically transmitted from the user terminal 3 is included in the payment information, the NIC number stored in the customer DB 41 may be inquired during the user verification procedure to check an exact user terminal 3, which may prevent fraudulent use of the information by an illegal user.

The central communication company server 4 verifies a user and then transmits the results to the payment gateway server 2. In addition, the central communication company server 4 is informed of a final approval for the payment from the payment gateway server 2, and then adds the payment amount to telephone charges and then bills it to the VoIP communication service subscriber.

FIGS. 2 and 3 show the functions of user verification and occupancy verification of the VoIP payment system according to the embodiment of the present invention.

First, the user verification function of the VoIP payment system 1 shown in FIG. 2 is described as follows. In FIG. 2, the payment gateway server 2 provides a popup payment window and receives payment information in a web type, which may be used both first and second embodiments of the present invention. The hub type used in the second embodiment of the present invention will be described later.

The user terminal 3 selects a VoIP payment as a payment manner on the payment page provided from the seller server 5. The seller server 5 informs the payment gateway server 2 of purchase information including a seller name, a seller code, a product name, a product code and a payment amount according to the selection of the VoIP payment by the user. The payment gateway server 2 configures a popup payment window based on the transmitted purchase information and transmits it to the user terminal 3 so as to request input of a secret number in the first embodiment or request a VoIP phone number in the second embodiment. The user inputs the secret number or the VoIP phone number, and the input payment information is transmitted from the user terminal 3 to the payment gateway server 2. At this time, the IP address of the user terminal 3 is included in the payment information and transmitted together. On occasions, NIC number information may be selectively further included and transmitted in the payment information.

The payment gateway server 2 adds a user verification request number to the transmitted payment information and then transmits it to the central communication company server 5, and the central communication company server 5 verifies the user by comparing the data of the payment information with the data in the customer DB 51, and then transmits user verification results to the payment gateway server 2. If only the user verification is needed in the approval policy of the payment gateway server 2, the payment gateway server 2 informs the user terminal 3 of payment completion if the user verification is successful, and informs the user terminal 3 of verification failure if the user verification is not successful. In addition, the payment gateway server 2 informs the central communication company server 5 of a final payment approval so as to report that the payment is completed.

FIG. 3 shows the occupancy verification function of the first and second embodiments, which is executed in addition to the user verification shown in FIG. 2. In case that the verification policy of the payment gateway server 2 is based on user verification and occupancy verification, the payment gateway server 2 arbitrarily generates a peculiar verification code if the user verification received by the central communication company server 4 is successful, and then transmits the generated verification code to the user terminal 3 together with a message informing of success of user verification. In addition, the payment gateway server 2 receives the verification code again from the user terminal 3. In order to receive the verification code again, the verification code may be displayed on a screen so that the user may be requested to input the verification code again. However, more preferably, a message requesting to press a confirmation button so as to check a final payment, without displaying the verification code, for the convenience of the user, and then the verification code is automatically transmitted again when the user presses the confirmation button.

FIG. 4 shows the secret number setting function of the payment gateway server according to the first embodiment of the present invention. In the first embodiment of the present invention, secret numbers are set to a plurality of users, and each user makes a payment by inputting his/her own secret number. A subject having an authority to setting a secret number is one registered as a VoIP communication service subscriber in the central communication company server 4. Referring to FIG. 2, the payment gateway server 2 receives purchase information from the seller server 5, and determines whether VoIP payment is firstly requested from the IP address of the user terminal 3 included in the purchase information. The payment gateway server 2 searches a secret DB 211 using the IP address to determine whether a secret number is registered. If there is no secret number registered, the user terminal 3 is determined to request a VoIP payment firstly.

In case of a first payment, the payment gateway server 2 requests input of a resident registration number of a user through the popup payment window. The payment gateway server 2 receives payment information including a resident registration number from the user terminal 3, and then transmits the payment information to the central communication company server 4 to request user verification. Here, the user verification is defined to check whether a user is a subscriber receiving VoIP communication service from the central communication company server 4 or not.

After that, the central communication company server 4 determines whether the user is verified or not, and then transmits the results to the payment gateway server 2 again. The central communication company server 4 first of all checks whether the data of the customer DB 41 is coincided with IP address, resident registration number, VoIP phone number or NIC number extracted from the customer information. And then, the central communication company server 4 determines whether or not to approve the user verification by checking overdue communication charges, or residual limit for a small amount of payment of the user. The present invention may be considered as a kind of credit transaction using post payment, so the payment amount may not be retrieved if a user delays communication charges. Thus, the user verification is made after checking whether the payment amount may be retrieved.

If the payment gateway server 2 receives the user verification results as successful from the central communication company server 4 and a current user is determined as a subscriber of the VoIP communication service, the user is requested to set a secret number. The payment gateway server 2 provides the user terminal 3 with a window requesting input of a secret number, and then receives a secret number and then stores it in a secret number DB 211. At this time, the secret number is stored together with the IP address and the resident registration number of the subscriber.

Here, the user may set not only his/her own secret number but also secret numbers of other persons, particularly a secret number for a minor. If the subscriber sets a secret number for a minor, the subscriber may be provided with minor payment intercepting service from the payment gateway server 2 so as to intercept payment at a specific site by a minor. In this service, when a minor requests a payment to a seller operating a specific site, the payment gateway server 2 inquires a minor payment interception DB 231, and, if it is checked that a payment by a minor is prohibited at this site, the payment is not approved and intercepted.

FIG. 5 shows a structure of the payment gateway server according to an embodiment of the present invention. The payment gateway server 2 shown in FIG. 5 is configured based on the first embodiment, but it may also be used for the second embodiment except components for secret number verification such as a secret number managing unit 21, a secret number verifying unit 22, a minor verifying unit 23, a secret number DB 211 and a minor payment interception DB 231.

The user terminal 3 may be a user PC or PDA having a browser function allowing to use Internet.

The payment gateway server 2 according to the first embodiment of the present invention includes a secret number managing unit 21, a secret number verifying unit 22, a minor verifying unit 23, a user verifying unit 24, an occupancy verifying unit 25, a payment approving unit 26, a secret number DB 211, a minor payment interception unit DB 231, a user verification DB 241, an occupancy verification DB 251, and a payment approval DB 261.

The secret number managing unit 21 processes a secret number setting function at a first payment for VoIP using a secret number of the first embodiment. If the user terminal 3 is determined to make a first VoIP payment, the secret number managing unit 21 receives payment information including a resident registration number from the user terminal 3, and then requests user verification to the central communication company server 4. If receiving a successful result for the user verification from the central communication company server 4 that the resident registration number is coincided with the subscriber information, the secret number managing unit 21 requests the user to set a secret number. In addition, the secret number managing unit 21 stores at least one secret number, transmitted from the user terminal 3, in the secret number DB 211 together with the IP address and the resident registration number of the subscriber of the VoIP communication service. Thus, the secret number DB 211 stores at least one kind of user information with different secret numbers for the same IP address and the same resident registration number of a subscriber.

The secret number verifying unit 22 receives a secret number from the user as the payment information during the payment procedure conducted after the secret number is initially set, and then checks the user. The secret number verifying unit 22 extracts IP address and secret number from the payment information received from the user terminal 3 and then compares them with data stored in the secret number DB 211 to verify the secret number.

If a user passing through the secret number verification is determined to have a secret number for a minor, the minor verifying unit 23 checks whether a site subjected to the payment is registered in the minor payment interception DB 231. If it is determined that the payment should be intercepted for a minor, a message informing that the payment is not allowed for a minor is transmitted to the user terminal 3.

In case the user terminal 3 makes a first VoIP payment, the user verifying unit 24 generates and adds a user verification request number in the received payment information, and then transmits it to the central communication company server 4 to request user verification. If it is not a first VoIP payment and the secret number verifying unit 22 determines the secret number successful, the payment information is reconfigured by deleting the secret number included in the payment information, adding a resident registration number of the subscriber, and generating and adding the user verifying request number. The reconfigured payment information is transmitted to the central communication company server 4.

The payment gateway server 2 of the present invention may complete the payment just after receiving a successful result for user verification from the central communication company server 4, or complete the payment by making occupancy verification additionally.

The occupancy verifying unit 25 is used for additionally conducting occupancy verification, and it verifies occupancy by generating a verification code, recording it in the occupancy verification DB 251, transmitting the generated verification code to the user terminal 3 to inform that the user verification is successful and request retransmission, and then comparing the verification code retransmitted from the user terminal with a verification code recorded in the occupancy verification DB 251.

The payment approving unit 26 is operated when the user verification is successfully made by the user verifying unit 24 or when the occupancy verification is successfully made by the occupancy verifying unit 25. That is to say, the payment approving unit 26 records approval details for VoIP payment request in the payment approval DB 261, informs the user terminal 3 of approval of the payment, and also informs the central communication company server 4 of final payment approval details. Here, the payment approval details include purchaser information, seller information, product name, payment amount, user verification request number and payment approval number.

Hereinafter, the user verification procedure and the payment approval procedure conducted by the central communication company server 41 will be described.

The central communication company server 41 receives request for user verification from the user verifying unit 24 together with the payment information. The central communication company server 41 extracts IP address and resident registration number from the payment information, and then compares them with data stored in the customer DB 41. The customer DB 41 is constructed using information registered by subscribers when users subscribe for VoIP communication service. Selectively, NIC number of the user terminal 3 is added to the payment information transmitted by the payment gateway server 2 to the central communication company server 4. In this case, the central communication company server 4 additionally compares the NIC number of the payment information with a NIC number stored in the customer DB so as to prevent illegal payment caused by fraudulent use of the payment information.

If the central communication company server 4 is informed of a final payment approval from the payment approving unit 26 of the payment gateway server 2, the payment amount is added to communication charges of the subscriber and then billed to the subscriber each month. If the payment amount is received from the subscribed, the payment amount is settled to a payment gateway server service provider except a predetermined commission. In addition, the payment gateway server service provider deducts his/her own commission and then pays the money to a seller, and then all procedures from the payment to the settlement are completed.

Hereinafter, the payment system 1 using a VoIP phone number according to the second embodiment of the present invention will be described with reference to FIG. 6.

FIG. 6 shows the user verification function of the VoIP payment system according to the second embodiment of the present invention. The second embodiment is classified into a web type and a hub type according to the way that the payment gateway server 2 receives payment information from the user terminal 3. The web type has been already described using FIG. 2.

In the hub type of the second embodiment, when the user terminal 3 selects VoIP payment, it is informed to the seller server 5, and the seller server 5 configures a popup payment window and provides it to the user terminal 3. Using the user terminal 3, a user inputs VoIP phone number as payment information, and then the payment information is transmitted to the seller server 5, and then transmitted to the payment gateway server 2. This hub type may be realized in the first embodiment, but the security level is low since the secret number of the user is transmitted to the seller server 5.

The payment gateway server 2 according to the second embodiment of the present invention includes a user verifying unit 24, an occupancy verifying unit 25, a payment approving unit 26, a user verification DB 241, an occupancy verification DB 251, and a payment approval DB 261.

The user verifying unit 24 receives payment information including IP address and VoIP phone number of a user according to the above-mentioned web or hub type. The user verifying unit 24 generates a user verification request number and adds it to the transmitted payment information, and then transmits it to the central communication company server 4 to request user verification.

After the request for user verification of the payment gateway server 2, following procedures such as user verification of the central communication company server 4, occupancy verification of the payment gateway server 2 and final payment approval informing are identical to the first embodiment and not described again. However, in the payment information of the VoIP payment system 1, the first embodiment uses a secret number input by a user as payment information for approval of payment, while the second embodiment uses a VoIP phone number input by a user as payment information for approval of payment.

FIG. 7 shows a screen of the popup payment window according to the first embodiment of the present invention. If a user inputs a secret number in the popup payment window and then presses a confirmation button, the user terminal 3 transmits the payment information including the secret number to the payment gateway server 2. Assuming that it is the first payment in the first embodiment, the item "payment secret number" displayed in the popup payment window in FIG. 7 is displayed as the item "resident registration number" and the user is guided to input a resident registration number. In addition, in case of the second embodiment, the item "VoIP phone number" is displayed to guide the user to input a VoIP phone number.

FIG. 8 shows the procedure of the VoIP payment method using a secret number according to the first embodiment of the present invention.

In a payment information receiving step S10, the payment gateway server 2 receives payment information including a secret number input by a user from the user terminal 3.

In a secret number certifying step S20, the payment gateway server 2 analyzes the received payment information to compare the extracted IP address and the extracted secret number with data stored in the secret number DB 211. In addition, in case the secret number is for a minor, the minor payment interception DB 231 is searched to determine whether a site of a service provider at which a minor intends to make a payment is a prohibited site. If the secret number verification is failed, the user terminal 3 is requested to input a secret number again.

In a user verification request and result receiving step S30, the payment gateway server 2 removes the secret number from the transmitted payment information and reconfigures the payment information by adding a resident registration number of the subscriber to request user verification to the central communication company server 4 and receive its result.

In case only the user verification is needed according to the verification policy of the payment gateway server 2, if the user verification is successful, the following step S60 is executed after the step S30.

If the occupancy verification should be made after the user verification, in the occupancy verification requesting step S40, the payment gateway server 2 generates a peculiar verification code and transmits it to the user terminal.

In a occupancy verification determining step S50, a verification code is retransmitted from the user terminal 3. For retransmission of the verification code, a verification code may be displayed on a screen of the user terminal 3 so that a user may input the verification code, or the verification code may be retransmitted when the user presses a payment confirmation button without displaying the verification code on the screen. If the occupancy verification is failed, the retransmission of the verification code is requested once more.

If the occupancy verification is successful, in a payment approval informing step S60, the payment gateway server informs the user terminal 3 that the payment is completed, and also informs the central communication company server that the payment is approved.

FIG. 9 shows the process of receiving payment information including a secret number of the payment gateway server according to the first embodiment of the present invention.

In a VoIP payment selection receiving step S11, the payment gateway server 2 receives purchase information together with an IP address of the user terminal 3 from the seller server 5.

In a user terminal first payment determining step S12, the payment gateway server 2 inquires the secret number DB 211 to determine whether a secret number allocated to the IP address of the user terminal 3 is existing.

If a secret number does not exist, in a resident registration number receiving step S13, the payment gateway server 2 transmits a popup payment window requesting input of a resident registration number of the VoIP communication service subscriber, and receives payment information including the resident registration number of the subscriber.

If a secret number exists, in a secret number receiving step S14, the payment gateway server 2 transmits a popup payment window requesting input of a payment secret number of a current user, and then receives payment information including the secret number.

FIG. 10 shows the user verification process of the payment gateway server according to the first embodiment of the present invention.

In a payment information reconfiguring step S31, the payment gateway server 2 deletes a secret number included in the transmitted payment information, adds a resident registration number of the subscriber, and adds a user verification request code to reconfigure the payment information.

In a user verification request step S32, the payment gateway server 2 transmits the payment information including a resident registration number of the subscriber to the central communication company server 4 to request user verification.

In a user verification determining step S33, the central communication company server 4 extracts IP address and a resident registration number of the subscriber from the transmitted payment information, and compares them with IP address and resident registration number of the VoIP communication service subscriber stored in the customer DB 41. In addition, the payment information may include NIC number of the user terminal 3. Comparing the NIC number allow more reliable user verification. In addition, the central communication company server 4 checks overdue communication charges, or residual limit for a small amount of payment of the subscriber together with the above-mentioned comparison of IP address, resident registration number of the subscriber and NIC number so as to determine whether or not to approve the user verification.

In a user verification result receiving step S34, the payment gateway server 2 receives a user verification result from the central communication company server 4.

FIG. 11 shows the secret number setting process of the payment gateway server 2 according to the first embodiment of the present invention.

If the user verification is successful and it is determined as a first VoIP payment from the user terminal 3, in a secret number setting request and secret number storing step S341, the payment gateway server 2 transmits a secret number inputting window to the user terminal 3, and then receives a secret number of the subscriber and stores it in the secret number DB 211.

FIGS. 12 to 15 show a VoIP payment method according to the second embodiment of the present invention, which will be explained based on differences from the former first embodiment.

FIG. 12 shows the procedures of the VoIP payment method using a VoIP phone number according to the second embodiment of the present invention.

In a payment information receiving step SA, the payment gateway server 2 receives payment information including a VoIP phone number input by a user in a popup payment window. In a web type, the payment information is received from the user terminal 3 through the popup payment window, and in a hub type the payment information of the user terminal 3 is received from the seller server 5.

In a user verification request and result receiving step SB, the payment gateway server 2 adds a user verification request number to the received payment information and transmits the added payment information to the central communication company server 4 to request user verification and receive its result.

In case only user verification is needed according to the verification policy of the payment gateway server 2, if the user verification is successful, the following step SE is executed after the step SB.

In an occupancy verification request step SC, the payment gateway server 2 transmits a verification code to the user terminal 3.

In an occupancy verification determining step SD, the verification code is received again from the user terminal 3. For retransmission of the verification code, it is more preferred that a verification number is automatically retransmitted for occupancy verification by using a confirmation button so as to support convenience of the user who inputs the verification number.

If the occupancy verification is successful, in a payment approval informing step SE, the payment gateway server 2 informs the user terminal 3 and the central communication company server 4 that the payment is approved.

FIG. 13 shows the payment information receiving process of the payment gateway server in a hub type according to the second embodiment of the present invention.

In a VoIP payment selecting step SA1, a user selects VoIP payment as payment information, and the seller server 5 is informed of it.

In a payment information receiving step SA2, the seller server 5 is informed that the user selects the VoIP payment, and configures a popup payment window and transmits it to the user terminal 3. The user inputs a VoIP phone number in the popup payment window, and the seller server 5 receives payment information including a VoIP phone number.

In a payment information receiving step SA3, the payment gateway server 2 receives the payment information including a VoIP phone number from the seller server 5.

FIG. 14 shows the payment information receiving process of the payment gateway server in a web type according to the second embodiment of the present invention.

In a VoIP payment selecting step SA4, the user selects VoIP payment as payment information in a payment page. This selection information is transmitted to the seller server 5.

In a VoIP payment request receiving step SA5, the payment gateway server 2 is informed the VoIP payment is selected by receiving IP address of the user and purchase information from the seller server 5.

In a payment information receiving step SA6, the payment gateway server 2 transmits a popup payment window to the user terminal 3, and receives payment information including a VoIP phone number from the user terminal 3.

FIG. 15 shows the user verification process of the payment gateway server according to the second embodiment of the present invention.

In a user verification request step SB 1, the payment gateway server 2 adds a user verification request number to the payment information including a VoIP phone number and then transmits it to the central communication company server 5 to request user verification.

In a user verification determining step SB2, the central communication company server 4 compares the IP address and the VoIP phone number of the transmitted payment information with data stored in the customer DB 41. In addition, the payment information may include NIC number of the user terminal 3. Also, the central communication company server determines whether or not to approve the user verification by checking overdue communication charges, or residual limit for a small amount of payment of the subscriber.

In a user verification result receiving step SB3, the payment gateway server 2 receives a user verification result from the central communication company server 4.

As mentioned above, the payment system and method for supporting user verification in VoIP configuration have been described. The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

Industrial Applicability

The payment system and method for supporting user verification in VoIP configuration according to the present invention may prevent illegal payment of a fraudulent user since the payment gateway server intermediates user verification through the central communication company server, and then conducts occupancy verification again to process the payment verification.

In addition, since the payment may be completed using a VoIP phone number that may be easily memorized by a user, the present invention gives easiness for users. Moreover, since customer information already registered in the central communication company server is used, a user may not separately input his/her own personal information for user verification.

Furthermore, by setting a secret number for a minor, it is possible to prevent persons under age from thoughtlessly making payments for contents provided at harmful sites.

The invention claimed is:

1. A VoIP (Voice over Internet Protocol) payment system for supporting user verification and payment in VoIP configuration by using a secret number input by a user, the system comprising:

a user terminal allocated with peculiar IP (Internet Protocol) address and VoIP phone number to receive VoIP communication service, comprising a processor and memory storing executable instructions that when executed by the processor causes the processor to perform the steps of:

receiving a secret number from a user as payment information through a popup payment window; and transmitting the IP address and the received secret number to a payment gateway server to receive a payment approval result for the payment information;

a payment gateway server comprising a processor and memory storing executable instructions that when executed by the processor causes the processor to perform the steps of:

receiving and storing a resident registration number and a secret number from the user terminal through a wire/wireless network;

receiving the payment information from the user terminal;

verifying the secret number by extracting the IP address and the secret number from the payment information;

transmitting, based on the success of the secret number verification, the payment information including the IP address and the registration number to a central communication company server;

informing the user terminal of whether the payment is approved according to the user verification result, and determining a final payment approval; and a central communication company server providing VoIP communication service to the user terminal, comprising a processor and memory storing executable instructions that when executed by the processor causes the processor to perform the steps of:

storing user information of the user terminal in a customer DB (database), comparing the payment information received from the payment gateway server with the user information stored in the customer DB;

transmitting a user verification result to the payment gateway server; and receiving the final payment approval from the payment gateway.

2. The VoIP payment system according to claim 1, wherein, in case an adult subscriber receiving the VoIP communication service makes a first payment through the user terminal, the processor of the payment gateway server performs the steps of:

requesting an input of a resident registration number to the user terminal;

receiving the payment information including the IP address and the resident registration number from the user terminal;

requesting user verification of the payment information to the central communication company server;

in case the user verification result is successful, receiving and storing a secret number from the user terminal; and receiving and storing additional secret numbers for other users and minors.

3. The VoIP payment system according to claim 1, wherein, in case the user verification result transmitted from the central communication company server is successful, the processor of the payment gateway server performs the steps of:

generating a peculiar verification code;

transmitting the verification code to the user terminal together with a message informing of the success of user verification and receiving the verification code input by the user again from the user terminal;

conducting occupancy verification by determining whether the verification code transmitted to the user terminal is coincided with the verification code received from the user terminal;

informing the user terminal of whether the payment is approved or not according to the occupancy approval result; and informing the central communication company server of a final payment approval in case the occupancy verification is successful.

4. The VoIP payment system according to claim 1, wherein the payment gateway server includes:

a secret number managing unit receiving IP address, resident registration number and secret number of a VoIP communication service subscriber from the user terminal, receiving additional secret numbers for other users and minors, and storing the transmitted IP address, the resident registration number and a plurality of the secret numbers;

a secret number DB for storing, by the secret number managing unit, the user information including the IP address, the resident registration number and a plurality of the secret numbers corresponding to the IP address;

a secret number verifying unit receiving the payment information from the user terminal, extracting the IP address and the secret number from the payment information, and searching the secret number DB to compare whether the IP address and the secret number are coincided;

a user verifying unit extracting, based on the success of the secret number verification, the resident registration number from the secret number DB, transmitting the payment information including the IP address and the resident registration number to the central communication company server, and receiving a user verification result from the central communication company server;

a user verification DB for storing, by the user verification unit, the payment information and the user verification result;

an occupancy verifying unit generating, based on the success of the user verification, a peculiar verification code, transmitting the verification code to the user terminal, and receiving a verification code input by the user from the user terminal to compare the received verification code with the transmitted verification code, in case the user verification result is successful;

an occupancy verification DB for storing, by the occupancy verifying unit, the generated verification code and the occupancy verification result;

a payment approving unit informing the user terminal whether the payment approval is approved or not according to the user verification result of the user verifying unit or the occupancy verification result of the occupancy verifying unit, and informing, based on the success of the payment approval, the central communication company server of a final payment approval; and a payment approval DB for storing, by the payment approving unit, the final payment approval result and payment amount information.

5. The VoIP payment system according to claim 1, wherein the payment gateway server includes:

a minor payment interception DB storing payment interception information including an address of a seller site at which a payment for a minor is prohibited; and a minor verifying unit receiving the payment information including a secret number for a minor from the user terminal, searching whether the seller site is registered in the minor payment interception DB, and determining that a secret number verification is failed for the searched seller site.

6. The VoIP payment system according to claim 1, wherein the user terminal is a user PC (Personal Computer) or PDA (Personal Digital Assistant) receiving VoIP communication service and endowed with an Internet phone number.

7. The VoIP payment system according to claim 1, wherein the processor of the payment gateway server performs the step of:

receiving payment information, which further includes a NIC (Network Interface Card) number peculiarly endowed to the user terminal, from the user terminal, and wherein the processor of the central communication company server performs the steps of:

comparing the NIC number of the payment information transmitted from the payment gateway server with a NIC number stored in the customer DB; and preventing illegal payment by fraudulent use of the IP address and the secret number or the VoIP phone number.

8. The VoIP payment system according to claim 1, wherein the processor of the central communication company server performs the steps of:

verifying the user by further comparing overdue communication charges and a residual limit for a small amount of payment of the subscriber;

receiving information of a final payment approval from the payment gateway server adding a payment amount to communication charges of the subscriber and billing the charge, and settling the payment amount received from the subscriber as a payment amount of a service provider of the payment gateway server except a predetermined commission.

9. A VoIP payment method for supporting user verification and payment in VoIP configuration by using a secret number input by a user, the method comprising:

(1) providing, by a payment gateway server, a popup payment window to a user terminal that selects VoIP payment, and receiving from the user terminal payment information including a secret number input through the popup payment window and an IP address of the user terminal;

(2) verifying, by the payment gateway server, the secret number by extracting the IP address and the secret number from the received payment information, and comparing the extracted IP address and the secret number with data stored in a secret number DB to verify the secret number;

(3) based on the success of the secret number verification, transmitting, by the payment gateway server, payment information including the IP address and a resident registration number of a subscriber of the IP address to a central communication company server, and receiving a user verification result from the central communication company server;

(4) based on the success of the user verification, generating, by the payment gateway server, a verification code and requesting occupancy verification to the user terminal;

(5) determining, by the gateway server, an occupancy verification result by receiving a user verification code from the user terminal, and comparing the received verification code with the generated verification code; and (6) based on the success of the occupancy verification, informing, by the payment gateway server, the user terminal of payment approval and informing the central communication company server of a final payment approval.

10. The VoIP payment method according to claim 9, wherein the step (1) includes:

(1-1) receiving, by the gateway server, the information that VoIP payment is selected by a user on a payment page provided from a seller server;

(1-2) determining, by the gateway server, whether VoIP payment is firstly made using the IP address of the user terminal;

(1-3) based on a first VoIP payment, providing, by the gateway server, a popup payment window to the user terminal, and receiving payment information including resident registration number and IP address from the user terminal through the popup payment window; and (1-4) based on not a first VoIP payment, providing, by the gateway server, a popup payment window to the user terminal, and receiving payment information including secret number and IP address from the user terminal through the popup payment window.

11. The VoIP payment method according to claim 9, wherein the step (3) includes:
- (3-1) searching, by the gateway server, the secret number DB with the IP address to find a resident registration number of the subscriber, and reconfiguring the payment information by removing the secret number of the received payment information and adding the resident registration number;
- (3-2) transmitting, by the gateway server, the reconfigured payment information to the central communication company server;
- (3-3) determining, the central communication company server, a user verification by comparing the IP address and the resident registration number of the received payment information with data stored in a customer DB, and checking overdue communication charges of the subscriber and a residual limit of a small amount of payment; and
- (3-4) receiving, by the payment gateway server, the user verification result from the central communication company server.

12. The VoIP payment method according to claim 11, wherein, based on the success of the user verification and a first payment, the step (3-4) includes:
- (3-4-1) requesting, by the payment gateway server, the user terminal to set a secret number of the user, and receiving and storing a secret number set by the user.

13. The VoIP payment method according to claim 12, wherein the step (3-4-1) further includes:
requesting, by the payment gateway server, a secret numbers for other users and minors additionally, and receiving and storing the secret numbers for other users and minors, set by the user.

14. The VoIP payment method according to claim 9, further comprising:
- (1-4-1) receiving, by the payment gateway server, payment information further including a NIC number, peculiarly endowed to the user terminal, from the user terminal; and
- (3-3-1) preventing, by the central communication company server, illegal payment by fraudulent use of the IP address and the VoIP phone number or the VoIP phone number by comparing the NIC number of the payment information transmitted from the payment gateway server with a NIC number stored in the customer DB.

15. The VoIP payment method according to claim 9, further comprising:
- (6-1) receiving, by the central communication company server, information of a final payment approval from the payment gateway server, adding a payment amount to communication charges of the subscriber, and billing the communication charges; and
- (6-2) settling, by the central communication company server, the payment amount received from the subscriber as a payment amount of a service provider of the payment gateway server except a predetermined commission.

16. The VoIP payment system according to claim 2, wherein the payment gateway server includes:

a secret number managing unit receiving IP address, resident registration number and secret number of a VoIP communication service subscriber from the user terminal, receiving additional secret numbers for other users and minors, and storing the transmitted IP address, the resident registration number and a plurality of the secret numbers;

a secret number DB for storing, by the secret number managing unit, the user information including the IP address, the resident registration number and a plurality of the secret numbers corresponding to the IP address;

a secret number verifying unit receiving the payment information from the user terminal, extracting the IP address and the secret number from the payment information, and searching the secret number DB to compare whether the IP address and the secret number are coincided;

a user verifying unit extracting, based on the success of the secret number verification, the resident registration number from the secret number DB, transmitting the payment information including the IP address and the resident registration number to the central communication company server, and receiving a user verification result from the central communication company server;

a user verification DB for storing, by the user verification unit, the payment information and the user verification result;

an occupancy verifying unit generating, based on the success of the user verification, a peculiar verification code, transmitting the verification code to the user terminal, and receiving a verification code input by the user from the user terminal to compare the received verification code with the transmitted verification code;

an occupancy verification DB for storing, by the occupancy verifying unit, the generated verification code and the occupancy verification result;

a payment approving unit informing the user terminal whether the payment approval is approved or not according to the user verification result of the user verifying unit or the occupancy verification result of the occupancy verifying unit, and informing, based on the success of the payment approval, the central communication company server of a final payment approval; and a payment approval DB for storing, by the payment approving unit, the final payment approval result and payment amount information.

17. The VoIP payment system according to claim 3, wherein the payment gateway server includes:

a secret number managing unit receiving IP address, resident registration number and secret number of a VoIP communication service subscriber from the user terminal, receiving additional secret numbers for other users and minors, and storing the transmitted IP address, the resident registration number and a plurality of the secret numbers;

a secret number DB for storing, by the secret number managing unit, the user information including the IP address, the resident registration number and a plurality of the secret numbers corresponding to the IP address;

a secret number verifying unit receiving the payment information from the user terminal, extracting the IP address and the secret number from the payment information, and searching the secret number DB to compare whether the IP address and the secret number are coincided;

a user verifying unit extracting, based on the success of the secret number verification, the resident registration number from the secret number DB, transmitting the payment information including the IP address and the resident registration number to the central communication company server, and receiving a user verification result from the central communication company server;
a user verification DB for storing, by the user verification unit, the payment information and the user verification result;
an occupancy verifying unit generating, based on the success of the user verification, a peculiar verification code, transmitting the verification code to the user terminal, and receiving a verification code input by the user from the user terminal to compare the received verification code with the transmitted verification code;
an occupancy verification DB for storing, by the occupancy verifying unit, the generated verification code and the occupancy verification result;
a payment approving unit informing the user terminal whether the payment approval is approved or not according to the user verification result of the user verifying unit or the occupancy verification result of the occupancy verifying unit, and informing, based on the success of the payment approval, the central communication company server of a final payment approval; and
a payment approval DB for storing, by the payment approving unit, the final payment approval result and payment amount information.

18. The VoIP payment system according to claim 2, wherein the payment gateway server includes:
a minor payment interception DB storing payment interception information including an address of a seller site at which a payment for a minor is prohibited; and
a minor verifying unit receiving the payment information including a secret number for a minor from the user terminal, searching whether the seller site is registered in the minor payment interception DB, and determining that a secret number verification is failed for the searched seller site.

19. The VoIP payment system according to claim 3, wherein the payment gateway server includes:
a minor payment interception DB storing payment interception information including an address of a seller site at which a payment for a minor is prohibited; and
a minor verifying unit receiving the payment information including a secret number for a minor from the user terminal, searching whether the seller site is registered in the minor payment interception DB, and determining that a secret number verification is failed for the searched seller site.

* * * * *